United States Patent
Elsner et al.

(10) Patent No.: US 6,720,406 B1
(45) Date of Patent: Apr. 13, 2004

(54) HIGH-PURITY POLYMER GRANULES AND METHOD FOR THE PRODUCTION THEREOF

(75) Inventors: Thomas Elsner, Düsseldorf (DE); Jürgen Heuser, Krefeld (DE); Christian Kords, Krefeld (DE); Steffen Kühling, Meerbusch (DE); Paul Viroux, Hove (BE)

(73) Assignees: Bayer Aktiengesellschaft, Leverkusen (DE); Bayer Antwerpen N.V., Antwerp (BE)

( * ) Notice: Subject to any disclaimer, the term of this patent is extended or adjusted under 35 U.S.C. 154(b) by 52 days.

(21) Appl. No.: 10/111,999

(22) PCT Filed: Oct. 23, 2000

(86) PCT No.: PCT/EP00/10401

§ 371 (c)(1), (2), (4) Date: Apr. 30, 2002

(87) PCT Pub. No.: WO01/32381

PCT Pub. Date: May 10, 2001

(30) Foreign Application Priority Data

Nov. 3, 1999 (DE) .......................................... 199 52 852

(51) Int. Cl.$^7$ .................................................. C08F 6/00
(52) U.S. Cl. ............... 528/499; 264/211.24; 264/176.1; 524/151; 524/611; 528/196; 528/198
(58) Field of Search .................. 264/211.24, 176.1; 524/151, 611, 706, 742; 528/196, 198, 499

(56) References Cited

U.S. PATENT DOCUMENTS 5,762,851 A * 6/1998 Hachiya et al. ........ 264/211.24
5,969,084 A 10/1999 Adachi et al. .............. 528/198

FOREIGN PATENT DOCUMENTS

| EP | 0 293 769 | 12/1988 |
| EP | 0 615 996 | 9/1994 |
| WO | 00/09582 | 2/2000 |

OTHER PUBLICATIONS

Database WPI, Section Ch, Week 198544, Derwent Publications Ltd., London, GB; AN 1985–273100, XP002158797 & JP 60 184814 A (Mitsubishi Gas Chem. Co. Inc.), Sep. 20, 1985 Zusammenfassung.

Database WPI, Section Ch, Week 199250, Derwent Publications Ltd., London, GB; AN 1992–410420, XP002158798 & JP 04 306227 A (Teijin Chem. Ltd.), Oct. 29, 1992, Zusammenfassung.

Database WPI, Section Ch, Week 199631, Derwent Publications Ltd., London, GB; AN 1996–305054, XP002158799 & JP 08 132437 A (Mitsubishi Gas Chem. Co. Inc.), May 28, 1996 Zusammenfassung.

* cited by examiner

Primary Examiner—Terressa Boykin
(74) Attorney, Agent, or Firm—Joseph C. Gil; Aron Preis; Gary F. Matz

(57) ABSTRACT

A process for producing polymer pellets is disclosed. The process that is particular suitable for making polycarbonate pellets entails extruding a polymer melt, cooling the extrudate by contacting it with a cooling fluid and pelletizing the solidified polymer. The process is characterized in that the cooling fluid has a solids particle content of at most 10 ppm.

12 Claims, No Drawings

HIGH-PURITY POLYMER GRANULES AND METHOD FOR THE PRODUCTION THEREOF

The invention relates to a process for producing polymer pellets, in particular polycarbonate pellets, from polymer melts, in particular polycarbonate melts, by melt extruding the polymer, cooling the melt in a cooling fluid and pelletizing the solidified polymer, in which process the cooling air or ambient air coming into contact with the polymer exhibits a solids particle content of at most 10 ppm, preferably at most 5 ppm, particularly preferably at most 0.5 ppm.

High purity polycarbonates are used for optical mouldings, for example for optical and magneto-optical storage media, in particular laser-readable or -writable data storage media. Since there is a desire for these media to exhibit ever greater storage capacity, the polycarbonates used have also to exhibit increased levels of purity.

Such high purity polycarbonate is additionally used in glazing for motor vehicles and diffusers for car reflectors, in which a high level of light transmission without imperfections in the moulding is of enormous importance. Glazing of other kinds, such as for greenhouses, so-called double-wall sheets or cellular sheets or solid sheets. These mouldings are produced by injection moulding, extrusion and extrusion blow moulding using a polycarbonate with a suitable molecular weight.

To produce polycarbonates by the so-called phase interface process, dihydroxydiarylalkanes in the form of their alkali-metal salts are reacted with phosgene in the heterogeneous phase in the presence of inorganic bases such as sodium hydroxide solution and an organic solvent, in which the produced polycarbonate is readily soluble. During the reaction, the aqueous phase is dispersed in the organic phase and, after the reaction, the organic polycarbonate-containing phase is washed with an aqueous fluid intended, inter alia, to remove electrolytes and the washing fluid is then separated off. The organic solvent is then removed from the polycarbonate. In the last stage, the polycarbonate is converted into a form, e.g. pellets, which may be readily further processed.

Another possible way of producing polycarbonates is the melt transesterification process or variants thereof (three stage processes involving melt production of oligocarbonate, crystallisation, solid phase polycondensation). Here too, the polycarbonate is converted after reaction/production into a form, e.g. pellets, which may be readily further processed.

If the conventional working-up/pelletizing processes are used, the quality of the polycarbonates, in particular with respect to impurities and imperfections in the polycarbonate, is observed to be inadequate for certain uses of the polycarbonates.

The object of the invention is to provide polycarbonates and copolycarbonates having even greater purity with regard to freedom from imperfections, which are suitable for producing mouldings, in particular optical mouldings, magneto-optical and optical data storage media with particularly high data densities or a particularly low occurrence of defects and which avoid the disadvantages of the known processes.

The number of imperfections in the polycarbonate may be determined by a laser film scan test.

It has been found that the necessary polycarbonate quality may be achieved with a process of the above-stated type if working-up/pelletisation of the polycarbonate is performed under certain special conditions, according to the characterising clause of claim 1.

The invention provides a process for producing polymer pellets, in particular polycarbonate pellets, from polymer melts, in particular polycarbonate melts, by melt extruding the polymer, cooling the melt in a cooling fluid and pelletizing the solidified polymer, characterised in that the cooling air or ambient air coming into contact with the polymer exhibits a solids particle content of at most 10 ppm, preferably 5 ppm, particularly preferably 0.5 ppm.

The preferred process is characterised in that the melt extrusion, cooling of the melt and pelletisation of the polymer are performed in an enclosed room.

Pelletisation is particularly preferably performed in a room, wherein the ambient air coming into contact with the polymer material is filtered in stages, the air being preferably initially filtered through primary filters of filter classes EU 5 to EU 7, then filtered through fine filters of filter classes EU 7 to EU 9 and finally through final filters of filter classes EU 13 to EU 14 (wherein the filter classes are determined to DIN 24183 or EUROVENT 4/5, 4/4 as at August, 1999).

These polymer pellets and the mouldings produced therefrom exhibit very good results when tested using the laser film scan test, the polycarbonates produced according to the invention comprising less than 250, in particular less than 150 imperfections per $m^2$ of extruded film.

The invention further provides the polymer pellets which may be obtained using the process according to the invention and the use thereof to produce transparent mouldings, wherein use for producing laser-readable data storage media is particularly desirable.

The invention likewise provides transparent mouldings made from the polymer pellets according to the invention.

The polymers to be used according to the invention are, for example, polycarbonates, both homopolycarbonates and copolycarbonates and mixtures thereof. The polycarbonates may be aromatic polyester carbonates or polycarbonates which are present in a mixture with aromatic polyester carbonates. The term polycarbonate is used below to cover all the above-mentioned polymers. The polycarbonate which is preferably used is obtained in particular by the so-called phase interface process or the melt transesterification process (H. Schnell "Chemistry and Physics of Polycarbonates", Polymerreview, Vol. IX, p. 33 ff., Interscience Publishers, New York 1964).

One of the preferred embodiments of the above-stated production process is a variant in which the feed materials are further processed according to the phase interface process, wherein the reaction solution containing polycarbonate is optionally filtered directly after the reaction, the aqueous phase is separated off and the polycarbonate solution obtained is optionally filtered again, washing is performed, the washing fluid is separated off and the solvent is evaporated, and the mixture of organic polycarbonate solution and residual washing fluid obtained after removal of the washing fluid is optionally heated until a clear solution is obtained, before filtration is performed again at least once, preferably twice, particularly preferably at least three times, very particularly preferably in stages to separate off the solids, the solvent is separated off from the polycarbonate, and the polycarbonate is worked up and pelletised under the conditions of the process according to the invention.

A preferred embodiment further provides, in addition to filtration of the cooling air or ambient air, that any cooling fluid which comes into contact with the polymer exhibits a foreign particle content of at most 2 million particles per 1 of water (particle size >0.5 μm), particularly preferably at most 1 million particles per 1 of water (particle size >0.5 μm), very particularly preferably at most 0.5 million particles per 1 of water (particle size >0.5 μm).

This may be achieved by filtration of the cooling fluid.

Filtration of the other feed materials, additives and cooling fluid medium is conveniently performed as a rule using membrane filters. The pore size of the filter materials amounts as a rule to from 0.01 to 5 μm, preferably from 0.02 to 1.5 μm, preferably from 0.05 μm to 0.6 μm. Such filter materials may be obtained commercially for example from Pall GmbH, D-63363 Dreieich and Krebsödge GmbH, D-42477 Radevormwald (SIKA-R CUIAS type).

In a preferred variant, filtration is carried out in stages with a plurality of filters, wherein coarser filters are conveniently used initially, followed by finer filters.

Another preferred polycarbonate production process is the melt polycarbonate process, in which, starting with aromatic diphenols, carbonic acid diaryl esters, catalysts and optionally branching agents, polycarbonate is produced at a temperature of 80° C. to 340° C. and a pressure of 1000 mbar (hPa) to 0.01 mbar (hPa).

Compounds preferably used as feed materials are bisphenols of the general formula HO—Z—OH, in which Z is a divalent organic residue with 6 to 30 carbon atoms containing one or more aromatic groups. Examples of such compounds are bisphenols belonging to the group comprising dihydroxydiphenyls, bis(hydroxyphenyl)alkanes, indan bisphenols, bis(hydroxyphenyl) ethers, bis(hydroxyphenyl) sulfones, bis(hydroxyphenyl) ketones and α,α'-bis (hydroxyphenyl)diisopropylbenzenes.

Particularly preferred bisphenols belonging to the above-mentioned groups of compounds are 2,2-bis(4-hydroxyphenyl)propane (BPA/bisphenol A), tetraalkyl-bisphenol A, 4,4-(meta-phenylenediisopropyl)diphenol (bisphenol M), 1,1-bis(4-hydroxyphenyl)-3,3,5-trimethylcyclohexanone, as well, optionally, as mixtures thereof. Copolycarbonates which are particularly preferred are those based on the monomers bisphenol A and 1,1-bis (4-hydroxyphenyl)-3,3,5-trimethylcyclohexane.

For the purposes of the invention, suitable carbonic acid diesters are Di-$C_6$ to $C_{14}$ aryl esters, preferably the diesters of phenol or alkyl-substituted phenols, i.e. diphenyl carbonate or dicresyl carbonate, for example. The carbonic acid diesters are used in amounts of 1.01 to 1.30 mol, preferably 1.02 to 1.15 mol relative to 1 mol of bisphenbi.

Care should be taken that the feed materials, i.e. the diphenols and carbonic acid diaryl esters, are free of alkali metal ions and alkaline earth metal ions, wherein amounts of alkali metal ions and alkaline earth metal ions of less than 0.1 ppm may be tolerated. Diphenols or carbonic acid diaryl esters exhibiting such levels of purity may be obtained by recrystallising, washing or distilling carbonic acid diaryl esters or diphenols. In the process according to the invention, the content of alkali metal ions and alkaline earth metal ions in both the diphenol and the carbonic acid diester should amount to a value of <0.1 ppm. The total chlorine content in the raw materials should not exceed a value of 2 ppm and the content of saponifiable chlorine in the carbonic acid diester should not exceed a value of 0.05 ppm. It is advantageous from the point of view of the colour of the resultant polycarbonate if the raw materials, i.e. the diphenols and the carbonic acid diaryl esters, have not passed through the solid phase in the event of purification by distillation of the raw materials in the last stage of production, i.e. a melt or mixed melt of the raw materials is introduced into the transesterification reaction or at least one of the raw materials is added in tluid form.

The polycarbonates in question may be branched in deliberate and controlled manner by using small amounts of branching agents, some suitable branching agents being:

phloroglucinol,
4,6-dimethyl-2,4,6,-tri(4-hydroxyphenyl)hept-2-ene,
4,6-dimethyl-2,4,6-tri(4-hydroxyphenyl)heptane,
1,3,5-tri(4-hydroxyphenyl)benzene,
1,1,1-tri(4-hydroxyphenyl)ethane,
tri(4-hydroxyphenyl)phenylmethane,
2,2-bis[4,4-bis(4-hydroxyphenyl)cyclohexyl]propane,
2,4-bis(4-hydroxyphenylisopropyl)phenol,
2,6bis(2-hydroxy-5'-methylbenzyl)-4-methylphenol,
2-(4-hydroxyphenyl)-2-2,4-dihydroxyphenyl)propane,
hexa(4-(4-hydroxyphenylisopropyl)phenyl) orthoterephthalic aoid ester,
tetra(4-hydroxyphenyl)methane,
tetra(4-(4-hydroxyphenylisopropyl)phenoxy)methane,
1,4-bis(4',4"-dihydroxytriphenyl)methyl)benzene and in particular α,α',α"-tris(4-hydroxyphenyl) 1,3,5-triisopropylbenzene.

Other possible branching agents are 2,4-dihydroxybenzoic acid, trimesic acid, cyanuric chloride and 3,3-bis(3-methyl-4-hydroxyphenyl)-2-oxo-2,3-dihydroindole.

The 0.05 to 2 mol % of branching agents optionally to be used, relative to the diphenols introduced, may be introduced together with the diphenols. Preferred catalysts are compounds of the general formulae 2 and 3:

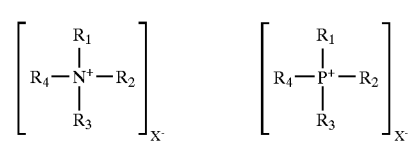

(Formulae 2 and 3)

wherein $R_{1-4}$ may be the same or different alkyls, aryls or cycloalkyls and X' may be an anion, in which the corresponding acid/base pair $H^+ + X^- \rightarrow HX$ has a $pK_B < 11$, as well as alkali metal/alkaline earth metal catalysts.

Suitable catalysts for the above-mentioned process are, for example:

tetramethylammonium hydroxide, tetramethylammonium acetate, tetrarnethyl-ammonium fluoride, tetramethylammonium tetraphenylboranate, tetraphenyl-phosphonium fluoride, tetraphenylphosphonium tetraphenylboranate, dimethyl-phenylammonium hydroxide, tetraethylammonium hydroxide, DBU, DBN or guanidine systems, such as for example 1,5,7-triazabicyclo[4.4.0]dec-5-ene, 7-phenyl-1,5,7-triazabicyclo[4.4.0]dec-5-ene, 7-methyl- 1,5,7-triazabicyclo[4.4.0]dec-5-ene, 7,7'-hexylidene-di-1,5,7-triazabicyclo[4.4.0]dec-5-ene, 7,7'-decylidene-di-1,5,7-triazabicyclo[4.4.0]dec-5-ene, 7,7'-dodecylidene-di-1,5,7-triazabicyclo[4.4.0]-dec-5-ene, or phospazenes, such as for example the phospazene base $P_1$-t-Oct=tert.-octylimino-tris(dimethylamino) phosphorane, phosphazene base $P_1$-t-butyl=tert.-butylimino-tris(dimethylamino)phosphorane, BEMP 2-tert.-butylimino-2-diethylamino-1,3-dimethylperhydro-1,3-diaza-2-phosphorine, as well as hydroxides, carbonates, halides, phenolates, diphenolates, fluorides, acetates, phosphates, hydrogen phosphates, hydridoborates of lithium, sodium, potassium, caesium, calcium, barium, magnesium.

These catalysts are introduced in amounts of from $10^2$ to $10^8$ mol, relative to 1 mol diphenol. The catalysts may also be introduced in combination (two or more).

Reaction of the aromatic dihydroxy compound and the carbonic acid diester may be performed continuously or discontinuously, for example in stirred-tank reactors, film evaporators, stirred-tank reactors in series, extruders, kneaders and disk reactors.

Where the phase interface process is used, compounds which are preferably introduced as input compounds are bisphenols of the general formula HO—Z—OH, in which Z is a divalent organic residue with 6 to 30 carbon atoms containing one or more aromatic groups. Examples of such compounds are bisphenols which belong to the group comprising dihydroxydiphenyls, bis(hydroxyphenyl)alkanes, indan bisphenols, bis(hydroxyphenyl) ethers, bis (hydroxyphenyl) sulfones, bis(hydroxyphenyl) ketones and α,α'-bis(hydroxyphenyl)diisopropylbenzenes.

Particularly preferred bisphenols belonging to the above-mentioned groups of compounds are 2,2-bis(4-hydroxyphenyl)propane (bisphenol A), tetraalkylbisphenol A, 4,4-(meta-phenylenediisopropyl)diphenol (bisphenol M), 1,1-bis(4-hydroxyphenyl)-3,3,5-trimethylcyclohexanone, as well, optionally, as mixtures thereof. Copolycarbonates which are particularly preferred are those based on the monomers bisphenol A and 1,1-bis(4-hydroxyphenyl)-3,3, 5-trimethylcyclohexane. The bisphenol compounds to be used according to the invention are reacted with carbonic acid compounds, in particular phosgene.

The polyester carbonates which are likewise suitable are obtained by reacting the bisphenols already mentioned, at least one aromatic dicarboxylic acid and optionally carbonic acid. Suitable aromatic dicarboxylic acids are, for example, orthophthalic acid. terephthalic acid, isophthalic acid, 3,3'- or 4,4'-diphenyldicarboxylic acid and benzophenonedicarboxylic acids.

Inert organic solvents used in the phase interface process are, for example, dichloromethane, the various dichloroethanes and chloropropane compounds, chlorobenzene and chlorotoluene, dichloromethane and mixtures of dichloromethane and chlorobenzene preferably being used.

The reaction may be accelerated by catalysts, such as tertiary amines, N-alkylpiperidines or onium salts. Use is preferably made of tributylamine, triethylamine and N-ethylpiperidine. A monofunctional phenol, such as phenol, cumylphenol, p.-tert.-butylphenol or 4-(1,1,3,3-tetramethylbutyl)phenol may be used as chain terminators and molar mass regulators. Isatin biscresol may be used as a branching agent, for example.

Where the phase interface process is used to produce the high purity polycarbonates preferably used in the process according to the invention, the bisphenols are dissolved in an aqueous alkaline phase, preferably sodium hydroxide solution. The chain terminators optionally required to produce copolycarbonates are dissolved in the aqueous alkaline phase or added thereto in an inert organic phase without solvent in amounts of from 1.0 to 20.0 mol % per mol of bisphenol. Phosgene is then introduced into the mixer containing the other reaction components and polymerisation is performed.

Chain terminators which may optionally be introduced are both monophenols and monocarboxylic acids. Suitable monophenols are phenol itself, alkylphcnols, such as cresols, p-tert.-butylphenol, p-cumylphenol, p-n-octylphenol, p-iso-octylphenol, p-n-nonylphenol and p-iso-nonylphenol, halophenols, such as p-chlorophenols, 2,4-dichlorophenol, p-bromophenol and 2,4,6-tribromophenol, as well as mixtures thereof.

Suitable monocarboxylic acids are benzoic acid, alkylbenzoic acids and halobenzoic acids.

Preferred chain terminators are phenols of the formula (I)

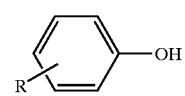

(I), in which R is hydrogen, tert.-butyl or a branched or unbranched CS and/or C, alkyl residue.

Phenol and p-tert.-butylphenol are preferred chain terminators.

The chain terminators should be used in an amount of from 0.1 mol % to 5 mol %, relative to the moles of diphenols used in each case. The chain terminators may be added before, during or after phosgenation.

If so desired, branching agents may additionally be added to the reaction. Suitable branching agents are the tri- or more than tri-functional compounds known in polycarbonate chemistry, in particular those with three or more than three phenolic OH groups.

Suitable branching agents are, for example, phloroglucinol, 4,6-dimethyl-2,4,6,-tri(4-hydroxyphenyl) hept-2-ene, 4,6-dimethyl-2,4,6-tri(4-hydroxyphenyl) heptane, 1,3,5-tri(4-hydroxyphenyl)benzene, 1,1,1-tri(4-hydroxyphenyl)ethane, tri(4-hydroxyphenyl) phenylmethane, 2,2-bis[4,4-bis(4-hydroxyphenyl)-cyclohexyl]propane, 2,4-bis(4-hydroxyphenylisopropyl) phenol, 2,6-bis(2-hydroxy-5'-methlybenzyl)-4-methylphenol, 2-(4-hydroxyphenyl)-2-(2,4-dihydroxyphenyl)propane, hexa(4-(4-hydroxyphenylisopropyl)phenyl)-orthotercphthalic acid ester, tetra(4-hydroxyphenyl)methane, tetra(4-(4-hydroxyphenylisopropyl) phenoxy)methane and 1,4-bis(4', 4"-dihydroxytriphenyl)-methyl)benzene as well as 2,4-dihydroxybenzoic acid, trimesic acid, cyanuric chloride and 3,3-bis(3-methyl-4-hydroxyphenyl)-2-oxo-2,3-dihydroindole. The amount of branching agent optionally used amounts to 0.05 mol % to 2 mol % relative, again, to the moles of diphenol used in each case.

The branching agents may either be initially introduced in the aqueous alkaline phase with the diphenols and the chain terminators or added before phosgenation in solution in an organic solvent.

Some, up to 80 mol %, preferably from 20 to 50 mol %, of the carbonate groups in the polycarbonates may be replaced by aromatic dicarboxylic acid ester groups.

Thermoplastic polycarbonates which are particularly preferably suitable for use in the process according to the invention have an average molecular weight $M_w$ (determined by measuring relative viscosity at 25° C. in dichloromethane and a concentration of 0.5 g polycarbonatet/100 ml dichloromethane) of from 12,000 to 400,000, preferably from 12,000 to 80,000 and in particular from 15,000 to 40,000.

During the phase interface reaction, the aqueous phase is emulsified in the organic phase, resulting in droplets of different sizes. After the reaction, the organic phase containing the polycarbonate is conventionally washed repeatedly with an aqueous fluid and separated as far as possible from the aqueous phase after each washing process. The polymer solution is turbid after washing and removal of the washing fluid. Aqueous fluid for separating off the catalyst, a dilute mineral acid such as HCl or $H_3PO_4$ and completely deionised water for further purification are used as washing fluid. The concentration of HCl or $H_3PO_4$ in the washing fluid may amount to from 0.5 to 1.0 wt. %, for example. The organic phase may be washed five times, for example.

Phase separating devices which may be used to separate the washing fluid from the organic phase comprise separating vessels, phase separators, centrifuges or coalescers known in principle or combinations of these means. To obtain the high purity polycarbonate, the solvent is evaporated. Evaporation may proceed in several evaporation stages. According to a further preferred embodiment, the solvent or some of the solvent may be removed by spray drying. The high purity polycarbonate is then obtained as a powder. The same applies to obtaining the particularly preferably suitable high purity polycarbonate by precipitation from the organic solution and subsequent residual drying. Another preferred embodiment comprises extrusion for evaporating residual solvent. Another working-up variant is the strand evaporator method.

After the various possible methods for removing the solvent or, in the event of the melt polycarbonate process, residual monomer removal/reaction, the polycarbonate is used in the pelletizing process according to the invention.

The particularly preferred pelletizing method consists, for example, in the fact that hot polymer strands discharging perpendicularly downwards from an interchangeable nozzle with integral screen in 1 to 5 rows, preferably in 1 to 3 rows, which may be parallel or offset in relation to one another, are gripped automatically by a belt pair running through a water bath, cooled and drawn to the desired diameter.

The belt pair pushes the polymer strands over a drying section, in which the adherent surface water is extensively removed by suction slots and blowing nozzles.

The polymer strands coming from the drying section are grasped in the pelletiser by a pair of draw-in rollers, advanced and cut into pellets by a rotating chopping blade, which rotates past a stationary blade or anvil blade with slight clearance.

The cut pellets then fall via a chute onto a sizing screen or into a centrifuge, in order to separate off any oversize material which may arise. The sizing screen or centrifuge is subjected to extraction, in order to draw off the water vapour produced by evaporation of the water from the pelletizing installation adhering to pellets.

The pelletiser is located in a closed production room, which is kept in particular under excess pressure in relation to the surroundings. This is achieved in that external air is sucked from the surrounding area by a fan through a pre- and after-heater for drying the air and then forced through a primary and fine filter system. From there, the dried and filtered air passes through ducts into the pelletizing station. The air in turn preferably enters via a plurality of air inlets.

The primary and fine filter system operates in that the air is preferably initially filtered through primary filters of filter classes EU 5 to EU 7, then filtered through fine filters of filter classes EU 7 to EU 9 and finally through final filters of filter classes EU 13 to EU 14 (to DIN 24183 or EUROVENT 4/5, 4/4).

In the pelletizing process, the air is preferably exchanged approximately 5 to 100 times per hour, preferably 10 to 70 times per hour, at the pelletizing station. In a particular embodiment of the invention, the cooling air or ambient air coming into contact with the polymer flows through the room, in particular in the production area, in laminar manner, preferably from top to bottom.

The inside of the room comprises in particular a slight excess pressure of 1 to 30 Pa relative to the ambient pressure.

Mouldings according to the invention of high purity polycarbonate are in particular optical and magneto-optical data storage media such as mini disks, compact disks or digital versatile disks, optical lenses and prisms, glazing for motor vehicles and headlights, glazing of other kinds, such as for green houses, so-called double-wall sheets or cellular sheets or solid sheets. These mouldings are produced by injection moulding, extrusion and extrusion blow moulding using the polycarbonate according to the invention with a suitable molecular weight.

The preferred molecular weight range is 12,000 to 22,000 for data storage media, 22,000 to 32,000 for lenses and glazing and 28,000 to 40,000 for sheets and cellular sheets. All the molecular weights refer to the weight average molar mass.

Conventional additives such as UV stabilisers, antioxidants and mould-release agents may also be added to the polycarbonates according to the invention in the amounts conventional for thermoplastic polycarbonates.

The mouldings according to the invention may optionally be surface hardened, for example they may be provided with a scratch-resistant coating.

To produce optical lenses and films or disks for magneto-optical data storage media, polycarbonates according to the invention may preferably be used which exhibit a molecular weight of 12,000 to 40,000, since a material with a molar mass in this range may be very readily melt-processed. The mouldings may be produced by injection moulding. To this end, the resin is melted at temperatures of from 300 to 400° C. and the mould is generally held at a temperature of 50 to 140° C.

To produce a sheet-type data storage material, for example, the high purity polycarbonate article according to the invention is produced in known plastics injection moulding machines suitable therefor.

The following Example serves to explain the invention.

EXAMPLES

Example 1

To produce polycarbonates, BPA (BPA is continuously combined as a melt with aqueous 6.5% NaOH) is mixed with aqueous 6.5% NaOH with the exclusion of oxygen. The NaOH used and the completely deionised water are filtered respectively using 0.6 $\mu$a (NaOH) and 0.1 $\mu$a filters (completely deionised water) made by Pall. This sodium dibisphenolate solution is then introduced into the polycarbonate reaction with phosgene and t-butylphenol as chain terminators. After the reaction, the reaction solution is filtered through a 1.0 $\mu$nom bag filter and fed to the washing stage. Here it is washed with 0.6% hydrochloric acid and then 5 more times with filtered completely deionised water. The organic solution is separated from the aqueous phase and, after heating to 55° C. is filtered initially using a 0.6 $\mu$a filter and subsequently a 0.2 $\mu$a filter. The solvent is then removed from the polymer by evaporation and 500 ppm glycerol monostearate (mould-release agent), previously filtered through a 0.2 $\mu$a filter, are then added to the polycarbonate melt. The polycarbonate, which exhibits a $M_W$ of 19 500, is then fed to the pelletizing process.

Pelletizing of the polycarbonate is performed under the following conditions: the ambient air is filtered in stages, the air being initially filtered through primary filters of filter class EU 6, then filtered through fine filters of filter class EU 8 and finally through final filters of filter class EU 13 (to DIN 24183 or EUROVENT 415, 4/4.

In addition, the air at the pelletizing station is exchanged approximately 60 times per hour, with the air flowing in laminar manner from top to bottom. The pelletizing station exhibits a slight excess pressure of 10 Pa (relative to the ambient pressure).

The cooling water used for pelictisation is filtered through a 0.1 μa filter made by Pall and, after filtration, exhibits 475 000 million particles/l of water of >0.5 μ.

A film is then extruded from the polycarbonate and this is tested for imperfections with the film laser scan test described below.

The extruded film is 200 μm thick and 60 mm wide. An He—Ne laser ("spot diameter" of 0.1 mm) scans the film with a scanning frequency of 5000 Hz in the widthwise direction and a travelling speed of 5 m/s in the lengthwise direction. All imperfections which cause scattering of the laser beam passing therethrough (from 0.10 mm diameter) are detected by a photomultiplier and counted using software. The number of optical imperfections per kg of polycarbonate or per m$^2$ of film is a measure of the surface quality of this film or the purity of the PC.

The results of the test are listed in Table 1 together with those of the two comparative tests. They show the superiority of the process according to the invention in comparison with pelletisation without air filtration.

Example 2

The process is performed as described for Example 1, except that the cooling water is not filtered at the pelletisation stage. The result of a laser scan test is reproduced in Table 1.

Comparative Example 1

The process is performed as described in Example 1, except that filtration of the ambient air is omitted. The test results described in Table 1 are then obtained.

Comparative Example 2

The process is performed as described in Example 1, except that filtration of the ambient air and filtration of the cooling water are omitted.

The test results described in Table 1 are then obtained.

TABLE 1

Evaluation of extruded film using film laser scan test.

| Imperfections per m$^2$ surface area | Polycarbonates from: | | | |
|---|---|---|---|---|
| | Example 1 | Example 2 | Comparative Example 1 | Comparative Example 2 |
| 0.10–0.30 mm | 25 | 40 | 130 | 139 |
| >0.30 mm | 32 | 45 | 148 | 163 |
| Total | 57 | 85 | 278 | 302 |

What is claimed is:

1. A process for producing polymer pellets, in particular polycarbonate pellets, from polymer melts, in particular polycarbonate melts, by melt extruding the polymer, cooling the melt in a cooling fluid and pelletizing the solidified polymer, characterised in that the cooling air or ambient air coming into contact with the polymer exhibits a solids particle content of at most 10 ppm, preferably at most 5 ppm, particularly preferably at most 0.5 ppm, wherein the process is carried out in an enclosed room under excess pressure in relation to the surroundings.

2. A process according to claim 1, wherein the ambient air coming into contact with the polymer material is filtered in stages, the air being preferably initially filtered through primary filters of filter classes EU 5 to EU 7, then filtered through fine filters of filter classes EU 7 to EU 9 and finally through final filters of filter classes EU 13 to EU 14 (wherein the filter classes are determined to DIN 24183 or EUROVENT 4/5, 4/4 as at August 1999).

3. A process according to claim 1, characterised in that the air is preferably exchanged approximately 5 to 100 times per hour, preferably 10 to 70 times per hour, at the pelletizing station.

4. A process according to claim 2, characterised in that the cooling air or ambient air coming into contact with the polymer flows through the room, in particular in the production area, in laminar manner, preferably from top to bottom.

5. A process according to claim 2, characterised in that the inside of the room comprises a slight excess pressure of 1 to 30 Pa relative to the ambient pressure.

6. A process according to claim 1, characterised in that the polymers used comprise transparent polycarbonates, in particular homopoly-carbonates, copolycarbonates or mixtures thereof, particularly preferably aromatic polyester carbonates or polycarbonates which are present in a mixture with aromatic polyester carbonates.

7. A process according to claim 1, characterised in that any cooling fluid which comes into contact with the polymer exhibits a foreign particle content of at most 2 million particles per l of water (particle size>0.5 μm), preferably at most 1 million particles per l of water (particle size>0.5 μm), particularly preferably at most 0.5 million particles per l of water (particle size>0.5 μm).

8. A process according to claim 1, characterised in that all the feed materials, the polymer, preferably dissolved in the solvent including the polymer additives, and the cooling fluid are fine-filtered prior to use, optionally in a plurality of stages.

9. A process according to claim 8, characterised in that the pore size of the filter materials amounts to from 0.01 to 5 μm, preferably from 0.02 to 1.5 μm, particularly preferably from approximately 0.05 μm to 1.0 μm.

10. Polymer pellets obtainable by a process according to claim 1.

11. Transparent mouldings produced from polymer pellets according to claim 10.

12. A process for producing polymer pellets comprising extruding a ploymer melt, solidifying the extrudate by contacting it with a cooling fluid to obtain a solidified polymer and pelletzing the solidified polymer, wherein cooling fluid contains particles at a concentration of at most 10 ppm, wherein the process is carried out in a closed room under excess pressure in relation to the surroundings.

* * * * *